Feb. 27, 1940.    G. CARWARDINE    2,191,846
FRICTION CLUTCH
Filed June 22, 1937    5 Sheets-Sheet 1

INVENTOR
G. CARWARDINE
BY
[signature]
ATTORNEYS

Feb. 27, 1940.   G. CARWARDINE   2,191,846
FRICTION CLUTCH
Filed June 22, 1937   5 Sheets-Sheet 3

INVENTOR
G. CARWARDINE
BY
ATTORNEYS.

Feb. 27, 1940.   G. CARWARDINE   2,191,846
FRICTION CLUTCH
Filed June 22, 1937   5 Sheets-Sheet 4

INVENTOR
G. CARWARDINE
BY
ATTORNEYS

Feb. 27, 1940.   G. CARWARDINE   2,191,846
FRICTION CLUTCH
Filed June 22, 1937   5 Sheets-Sheet 5

INVENTOR.
G. CARWARDINE.
BY
ATTORNEYS.

Patented Feb. 27, 1940

2,191,846

UNITED STATES PATENT OFFICE 2,191,846

FRICTION CLUTCH

George Carwardine, Bath, England

Application June 22, 1937, Serial No. 149,788
In Great Britain June 25, 1936

9 Claims. (Cl. 192—105)

This invention relates to friction clutches. Such devices are most commonly used for transmitting rotary motion from a driving shaft or other member to a driven shaft, but friction clutches are also used as brakes for retarding angular motion, in which case a rotary member and a stationary member have to be brought into engagement. The invention is concerned with friction clutches of all kinds, and in particular, is applicable to clutches acting as brakes both for bringing machinery to rest and for maintaining a rotating member at a regulated speed, as is required frequently in speed regulating devices.

One important application of the invention is to friction clutches of which the surfaces are brought into operative engagement by means of centrifugal force. Such clutches have been proposed for automatically engaging the transmission gear of motor vehicles upon the driving member attaining a predetermined speed. Centrifugally operated clutches have been suggested in which revolving masses in the form of expanding shoes lined with friction material are pressed into operative engagement within a surface of a cylinder or drum by centrifugal force; however, these clutches are in fact impracticable when designed to engage at such comparatively low speeds, within the range of so small a change of speed, as is generally desirable in motor vehicles and the like, because of the enormous excess of centrifugal force which in that case would be generated at higher velocities.

The present invention, therefore, aims at providing a form of friction clutch in which the force required to be exerted for operating the clutch, whether that force is a centrifugal force or exerted by the operator is so considerably reduced that it need not be greater than that necessary to overcome friction, and in the case of centrifugal clutches the engagement can be effected at as low a speed and within as small a range of velocity change as desired.

According to the present invention, a friction clutch is furnished with an operating mechanism which includes two elastic force units. One of these units, which will be called the first unit, serves primarily as a resilience and is inserted between an engaging part of the clutch and a member or members by which the engaging force is applied and actually this unit is separate from and additional to the resilience which may reside in the parts of the mechanism for transmitting the forces for operating the clutch. The other elastic force unit, which will be called the second unit, comprises a mechanism by means of which the falling force characteristic of a relaxing spring or the like is converted into a rising force effort and the said mechanism is so arranged that it may be set in a position in which it is rendered capable of storing energy in the first elastic force unit and in doing so it can supply a force required to maintain the engaging parts of the clutch in operative engagement.

The first unit may conveniently be constituted by a number of helical compression springs which are compressed by the second unit when the latter is rendered active. The second unit, as already indicated, may consist of any form of mechanism which converts the falling force characteristic of a relaxing spring or the like into a rising force effort. In its simplest form, however, the second unit comprises one or more levers or struts associated with one or more springs, the levers or each lever being mounted so as to rock to and from a dead centre position with respect to the line of action of its respective springs, and the springs being arranged so that a transverse component of the force exerted by the springs is available for opposing that exerted by the first unit.

The two elastic force units may be made exactly or nearly to balance one another throughout the effective range of movement of the mechanism so that apart from the effort required to overcome friction, no additional force or only a small force is needed to put the clutch either in or out of engagement. When the clutch is arranged as a centrifugal clutch, the first elastic force unit is given a higher rate than the rate of the second elastic force unit and energy is only stored in the first unit when the force exerted by the second is supplemented by the centrifugal force exerted by one or more masses rotated with the driving member of the clutch so that the latter is automatically brought into engagement upon the driving member attaining a predetermined speed. When the first member comprises a number of springs it is the combined rate of all these springs which comes into question and when this combined rate is made a little greater than that of the second unit which may comprise a number of extension springs, the resistance intended to be overcome by the centrifugal force exerted by the rotating masses may be provided by additional springs to the compression springs referred to but yet forming part of the first elastic force unit. These additional springs may act between an engaging part of the clutch and a fixed part of the housing so that when the rotating masses begin to exert force, the clutch parts are moved into engagement and the additional springs are quickly compressed to their full extent and thereupon the force exerted by them remains constant. This latter arrangement has the further advantage that the additional springs may be made to serve a further useful purpose, that is to say, they may keep the engaging part of the clutch quite free of the driven part when the clutch is disengaged.

The invention lends itself to various neat and compact forms of construction. The first elastic force unit may consist of a number of helical compression springs arranged to exert their pressure directly on a member which forces the clutch members into engagement and between a floating plate or similar member on which the second elastic member directly exerts its force. In such a case there are no linkages or joints, or practically none, in the mechanism transmitting the force to bring the clutch into engagement, and therefore, no inherent resilience in this mechanism. The second elastic force unit, as already indicated, may comprise a number of springs which are stressed in a dead centre position when the clutch is disengaged. The first elastic force unit, in serving as a resilience, is necessary to enable the springs of the second unit to be moved from their dead centre positions, and the total force exerted by the second unit is resiliently transmitted through the compression springs to the clutch engaging parts.

In order that the invention may be more clearly understood and readily carried into effect, several forms of construction in accordance therewith will now be described by way of example with reference to the accompanying drawings, in which.

Figure 1:
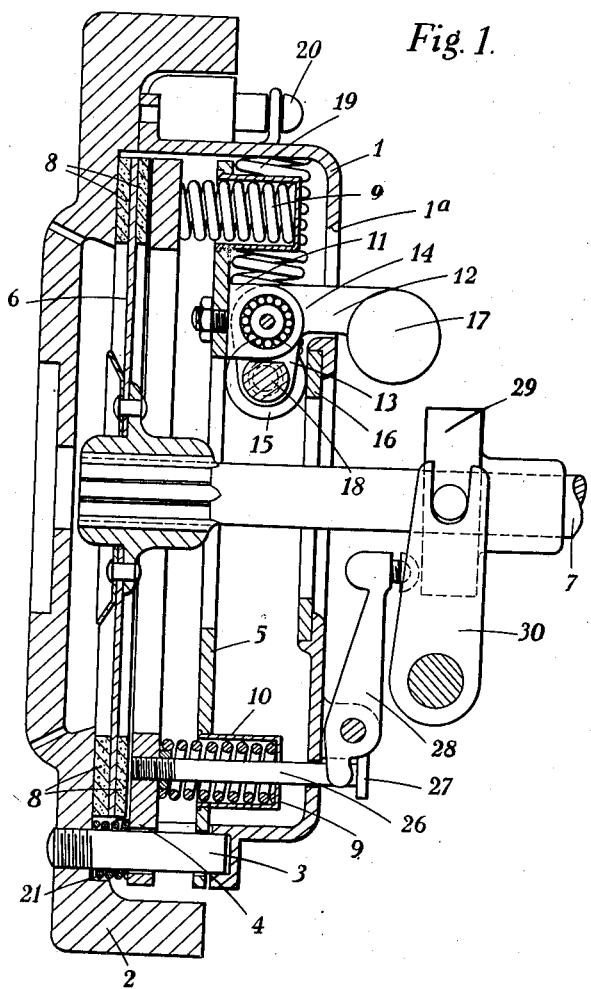
Figure 1 is a central longitudinal section of a form of centrifugal or automatic clutch suitable for use on a motor vehicle.
Figure 2:
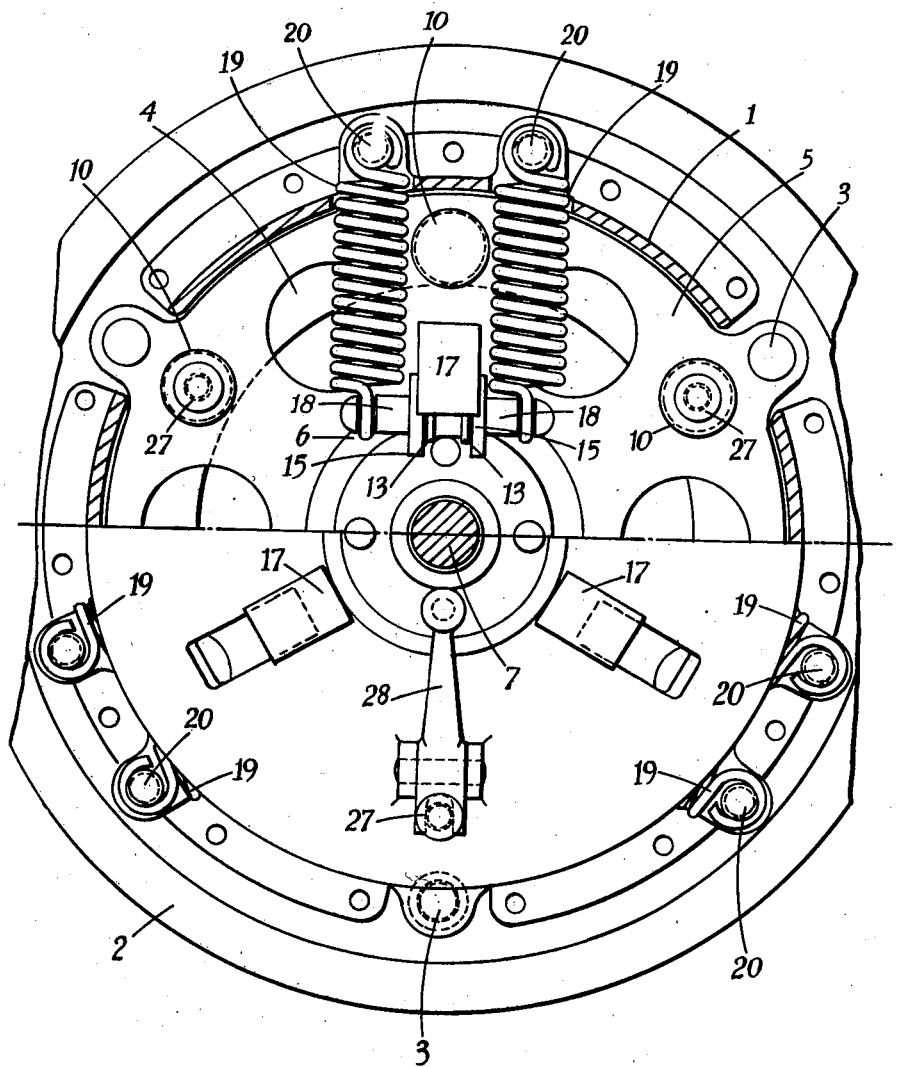
Fig. 2 is an elevation seen from the right in Figure 1 with the casing partly removed in the upper half.

Referring to Figures 1 and 2, a cylindrical casing 1 is secured at its flanged open end to the engine fly wheel 2 so as to run coaxially with the latter. Around the inner surface of the cylindrical part of the case 1 are a number of guide pins 3 screwed into the fly wheel 2. These pins 3 serve to guide a pair of discs or plates 4, 5 arranged to slide within the casing 1 with their faces substantially parallel to the face of the fly wheel 2. Between the disc 4 and the face of the fly wheel is interposed a third disc or plate 6 which is in fact the driven plate of the clutch and is keyed to the driven shaft 7, the bearing of which is not shown. In the case of a motor vehicle, however, the shaft 7 would be the input shaft to the gear box of the vehicle. The plate 6 is faced on both sides with friction material 8, arranged to come into contact respectively with the face of the fly wheel 2 and the plate 4.

A number of helical compression springs 9 are interposed between the plates 4 and 5. In the examples shown there are six such springs 9, and as seen in Figure 1 the total length of the clutch is reduced by housing the right hand ends of the springs 9 in shells or ferrules 10 secured in the plate 5. The springs 9 are designed so that a combined force exerted by them, when properly compressed by a movement of the plate 5 to the left, is sufficient to provide the necessary driving torque on the driven plate 6, so that the springs 9 constitute the first elastic force unit already referred to.

The plate 5 is provided with three lugs 11 distributed equidistantly around the plate and serving as bearings for the pivots of three bell crank levers 12. When the parts are in the disengaged position, as shown in Figure 1, the compression springs 9 being then just free, it will be seen that one arm 13 of each bell crank lever 12 is directed towards the axis of the clutch, while the other arm 14 is directed parallel to the shaft 7 away from the plate 5. The arm 13 of each bell crank is provided with a pair of freely mounted rollers 15 adapted to remain in contact with a bearing ring 16 fixed in the outer plate of the casing 1. The free end of the other arms 14 of the bell cranks each bear a suitable mass 17 for providing the necessary centrifugal force. The pin 18 which forms the journal of the bearing of the free mounting of the rollers 15 is extended in both directions beyond the face of its bell crank lever 12, as seen in Figure 2, and these ends serve as one anchoring point for each of a pair of stressed helical extension springs 19 which, at their other or outer ends, are anchored to similarly spaced projections 20 carried from the cylindrical part of the casing 1. The pins 18 and 20 are so located axially of the shaft 7 that the axes of the springs 19 are parallel to the face of the fly wheel 2 and the springs 19 are fully extended in the dead centre position shown in Figure 1 when the springs 9 are just free. In that position, also, the freely mounted rollers 15 are only just in contact with the face of the bearing ring 16.

Thus, in the particular form shown in Figures 1 and 2, the essential element of the second elastic force unit are the pairs of stressed extension springs 19 and the inwardly directed arms 13 of the bell crank levers 12, and it will be seen that while the levers 12 are in equilibrium with respect to the force of the springs 19 in the wholly disengaged position of the clutch shown in Figure 1, that equilibrium is unstable and any outward movement of the arms 14 due to centrifugal force will cause the pivots of the bell cranks 12 to move to the left in Figure 1, so that immediately the springs 19 exert an increasing counter-clockwise moment on the bell cranks 12, which, when added to that exerted by the centrifugal force will, owing to the reaction of the rollers 15 present on the ring 16, force the plate 5 to move to the left in Figure 1 against the increasing resistance of the springs 9, and in this way effect engagement of the clutch.

It may be mentioned that, in this case, the springs 9 and the springs 19 may be arranged to be balanced or substantially balanced in all positions over the range of movement and when no centrifugal force is exerted, it is arranged for further compression springs 21 to maintain the plate 4 clear of the driven plate 6. The springs 21 act directly between the face of the fly wheel 2 and the plate 4 and provide the resistance to the centrifugal force of the weighted arms 12 so as to ensure their co-operation at the proper instants. In other words, in the dead centre position or disengaged position shown in Figure 1, the springs 19 have no effective action and it is the pressure exerted by the springs 21 alone which determines at what centrifugal force the springs 19 can be moved off the dead centre position.

It should also be noticed that since the bearing ring 16 is fixed in the casing 1, the pivots of the rollers 15 never move with respect to the casing and as the anchoring pins 20 are also carried from the casing 1 it follows that the axes of the springs 19 remain parallel to the face of the fly wheel 2 in all positions of the mechanism so that in this form of construction the force exerted to overcome the resistance of the compression springs 9 is not only a transverse component of the force exerted by the extension springs 19, but in actual fact, in this case it is a right angular component. When this particular relation exists between the force of the relaxing springs 19 and the transverse component, it is a fact that by designing the springs 19 so that their maximum extension is substantially equal to the length of the strut or lever 13 of the system, that is to say, so that if the bell crank 12 were turned through a right angle, the spring 19 would be completely relaxed, the right angular component is then of exactly the proper order required for overcoming the resistance of the springs 9 whether they are compression springs, as shown, or extension springs.

Figure 3:
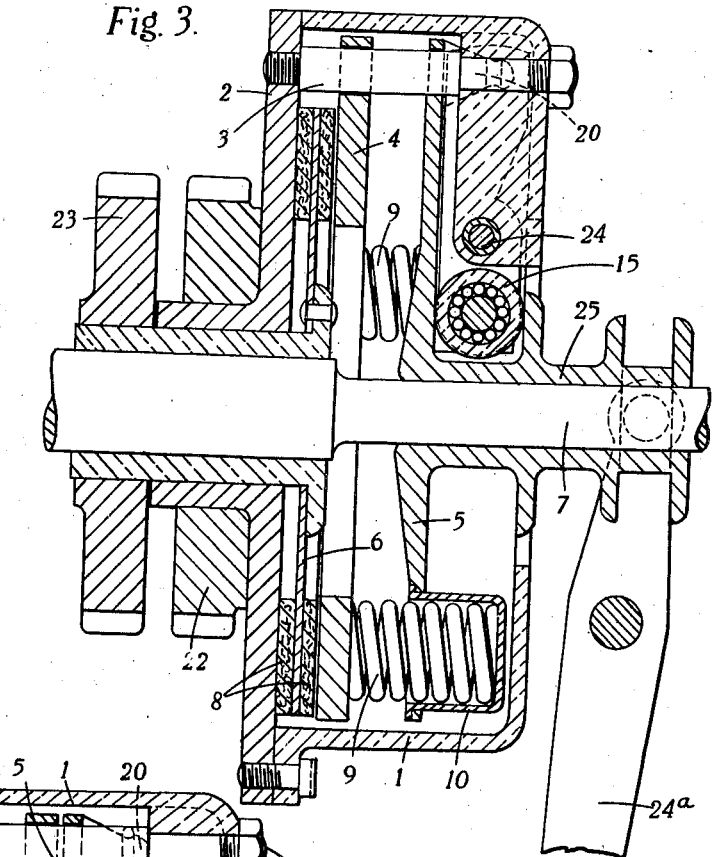
Figure 3 is a view similar to Figure 1 showing a manually-operated clutch suitable for driving machine tools, the parts being shown in the disengaged position.
Figure 4:
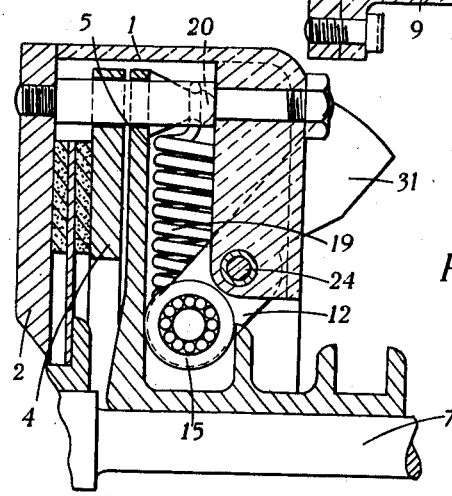
Figure 4 is a view corresponding to the upper part of Figure 3 with the parts in the engaged position.
Figure 5:
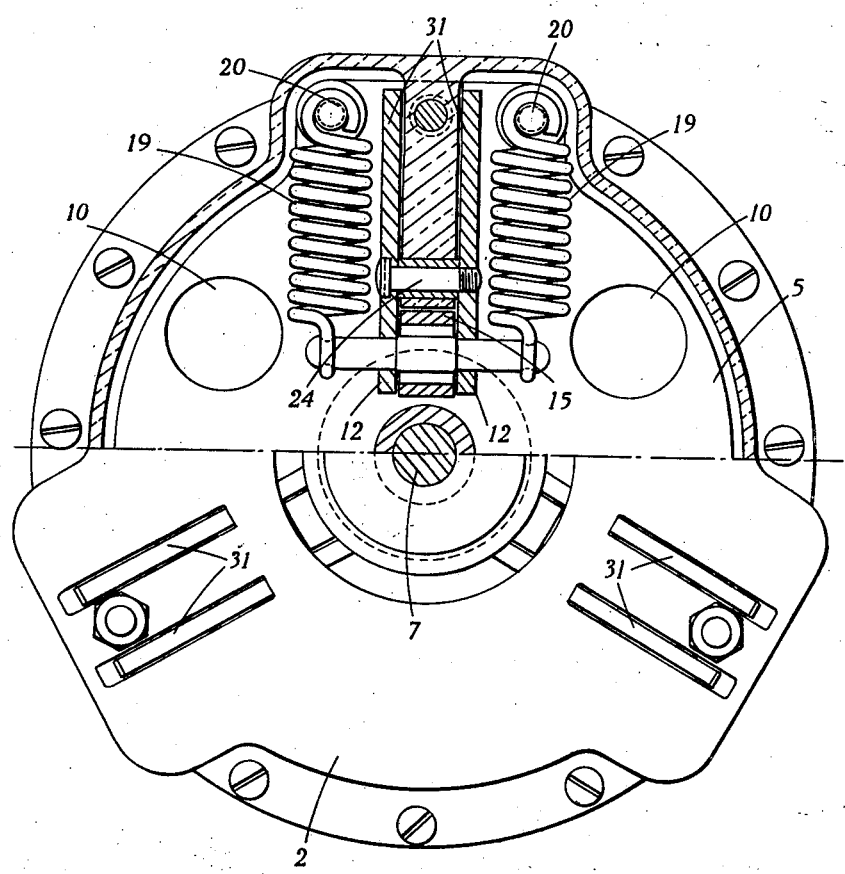
Figure 5 is an elevation from the right of Figure 3 similar to that shown in Figure 2.

For the reasons already given, the rate of the springs 9, together with the springs 21, is made a little greater than that of the springs 19, the difference depending upon the speed at which it is desired the centrifugal masses 17 shall cause engagement of the clutch, but it is possible to make the rates of both elastic force units the same throughout their range, and indeed, a clutch designed on that principle is shown in Figures 3 to 5.

In these figures the casing 1 corresponds to the casing 1 in Figures 1 and 2, and the driving member 2, on which a spur wheel 22 is mounted, corresponds to the fly wheel 2 in Figures 1 and 2. In this case the clutch is intended for use with a machine tool, so that the driven shaft 7 carries a spur wheel 23 which may form the first member of the gearing, say, of a lathe, the plates 4, 5 corresponding exactly to the corresponding parts in the previous construction as do the driven clutch plate 6 and the friction material 8. The springs 9 likewise bear between the plates 4 and the ferrules 10 carried by the plate 5. The plates 4 and 5 are also guided on pins 3. The second elastic force unit, however, is slightly differently arranged in this case. The levers 12 are pivoted at 24 to the casing 1 instead of to the plate 5, and since the lower end of the springs 19 are now anchored to the pivots of the rollers 15 which move to the left with the plate 5, the pins 20 forming the upper anchor for the springs 19 are also carried from the plate 5 so that again the axes of the springs 19 remain parallel to the face of the driving member 2 over the whole range of movement.

In Figure 3 the parts are in such a position that the springs 19 are on their dead centre and the clutch is engaged manually by means of a lever 24a which engages a sleeve 25 forming part of the plate 5. As soon as the plate 5 is moved slightly to the left the lower end of the lever 12 is moved slightly to the left and the springs 19 are enabled to exert clockwise moment on these levers and to apply the clutch in a manner similar to that described with reference to Figures 1 and 2.

In this case, as already indicated, it is assumed that the springs 9 are exactly balanced by the springs 19 in all positions of the mechanism, so that all the operator has to do is to overcome friction in the parts whereupon the springs 19 immediately come into play and the full force exerted by them is utilised in maintaining the clutch plates in engagement.

In this form of construction the operator positively withdraws the clutch when desired. In the form of construction shown in Figures 1 and 2, the clutch is withdrawn automatically on the speed falling to a predetermined amount but it may be desirable to provide means enabling the operator to disengage the clutch, even if the speed is too high for this to happen automatically. To provide for this, small pull rods 26 are screwed into the plate 4 and heads 27 on these rods may be engaged by levers 28 which revolve with the casing 1. These levers are engaged by the flat surface of a non-revoluble disc 29 which, however, by lever and fork mechanism 30, can be moved to the left to withdraw the plate 4, or again moved to the right in the path of the levers 28. To make this possible even at the highest speeds, it is arranged that the arms 12 come into contact with the casing at the point 1a, when the plate 5 is still well clear of the plate 4.

In the constructions shown in Figures 3 to 5, since the lever 12 and its pivot is set off the centre of the shaft 7 it would exert a certain outward centrifugal force at speed but this force can be balanced by that of a counterbalancing mass 31 on an extension of the lever 12. It is evident, however, that this state of balance can only exist in one angular position of the lever 12, since when the lever 12 rocks, the mass 31 moves nearer the shaft 7 and the mass at the lower end of the lever 12 moves further away so that the centrifugal force would be out of balance and tend to cause further rocking of the lever 12 in a clockwise direction and assist in the full engagement of the clutch. Similarly, if the operator in disengaging the clutch passes over the balanced position, then it is clear that the force exerted by the mass 31 is then greater than that exerted by the lower end of the lever 12 and the unbalanced centrifugal force will move the lever 12 still more counter-clockwise and complete the disengagement of the clutch.

Figure 6:
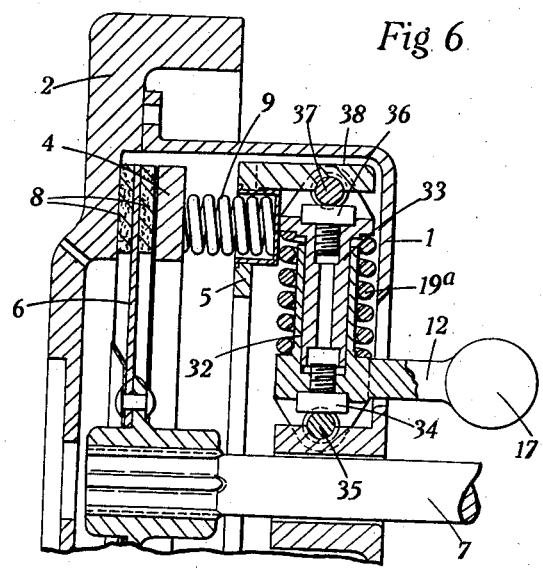
Figure 6 is a section similar to Figure 1 of the upper part of a clutch of slightly modified construction.

In Figure 6, a form of construction similar to that in Figure 1 is illustrated and corresponding reference numerals have been employed. In this case, however, the arrangement of bell crank levers and extension springs is replaced by an equivalent arrangement of compression springs and telescoping struts. The springs in this case are compression springs 19a, and they bear between an outer sleeve member 32 and an inner member 33 which telescopes within the member 32 so as to tend to separate them. The outer member 32 terminates at the lower end in a head 34 with a hardened plane lower surface bearing on a pin 35 mounted in an extension of the casing 1. Similarly the inner member 33 terminates at its upper end in a similar head 36 with a plane upper face bearing against a pin 37 which, however, is mounted in an extension 38 of the plate 5. The lever 12 and mass 17 form an extension of the outer member 32.

In the position shown in Figure 6, which is the dead centre position, the springs 19a simply tend to press apart the pins 35 and 37. However, when there is sufficient centrifugal force to rock the lever 12 and the member 32 which carries it, the pin 37 is moved slightly to the left and the thrust of the spring 19a commences to have an increasing component directed to the left and tending to press the plate 5 to the left, with the result that the springs 9 are compressed and the clutch engaged as in connection with Figure 1.

The invention can be applied in the form of a centrifugal clutch for driving machinery and then incorporated in the design of the driving pulleys. For example, a pulley so constructed could be driven by a synchronous electric motor and would run free of its shaft, with the clutch disengaged, until the speed approached the synchronous speed of the motor when the clutch would be engaged by centrifugal force and the load would be driven. This enables a synchronous motor to be run up to speed light and then to take up the load.

I claim:

1. A friction clutch comprising in combination, frictionally-engaging parts, a movably-mounted member for transmitting engaging force to said parts, a first elastic force unit interposed between said member and one of said frictionally-engaging parts, a second elastic force unit having a lower rate than said first elastic force unit and comprising a converter mechanism organized to convert the falling force characteristic of a relaxing elastic member into a rising force effort and in operative connection with said movably-mounted member, and centrifugal means for supplementing the action of said converter mechanism and for rendering same operative upon said movably-mounted member to take part, in conjunction with said centrifugal means, in storing energy in said first elastic force unit and so to bring said frictionally-engaging parts into engagement at a predetermined speed of rotation.

2. A friction clutch comprising in combination, frictionally-engaging parts, a movably-mounted member for transmitting engaging force to said parts, a first elastic force unit interposed between said member and one of said frictionally-engaging parts, a second elastic force unit having substantially the same rate as said first elastic force unit and comprising a converter mechanism organized to convert the falling force characteristic of a relaxing elastic member into a rising force effort and in operative connection with said movably-mounted member and means for rendering said converter mechanism operative upon said movably-mounted member to take part in storing energy in said first elastic force unit and so to bring said frictionally-engaging parts in engagement.

3. A friction clutch comprising in combination, frictionally-engaging parts, a movably-mounted member for transmitting engaging force to said parts, and a first elastic force unit interposed between said member and one of said frictionally-engaging parts, and a second elastic force unit comprising a converter mechanism organized to convert the falling force characteristic of a relaxing elastic member into a rising force effort and in operative connection with said movably-mounted member, said second elastic force unit substantially balancing said first elastic force unit throughout the range of movement so that only the force necessary to overcome friction is required to engage or disengage the clutch.

4. A friction clutch comprising in combination, frictionally-engaging parts, a movably-mounted member for transmitting engaging force to said parts, a first elastic force unit interposed between said member and one of said frictionally-engaging parts, a second elastic force unit comprising a spring and a lever associated therewith and mounted so as to rock to and from a dead centre position with respect to the line of action of said spring, said spring being arranged so that when said lever is rocked to one side of its dead centre position, a transverse component of the force exerted by said spring is applied to oppose that exerted by said first elastic force unit, and a rotatably-mounted mass operatively connected with said lever to rock the latter from its dead centre position by centrifugal force and so to render said spring effective at a predetermined speed of rotation.

5. A friction clutch comprising in combination, a driving element, a driven element, a movably-mounted plate for transmitting engaging force to one of said elements, a plurality of compression springs interposed between said plate and the said one of said elements, a plurality of levers each fulcrumed in said movably-mounted plate, a plurality of extension springs each anchored to one of said levers and to a fixed anchor point, each of said levers being mounted to rock to and from a dead centre position with respect to the line of action of its associated spring, and means for moving said levers from their dead centre positions to enable said extension springs to exert a transverse component of their force upon said movably-mounted plate to oppose the force exerted by said compression springs and to effect frictional engagement of said driving and driven elements.

6. A friction clutch comprising in combination, a driving element, a driven element, a movably-mounted plate for transmitting engaging force to one of said elements, a plurality of compression springs interposed between said plate and the said one of said elements, a plurality of levers each fulcrumed in said movably-mounted plate, a plurality of extension springs each anchored to one of said levers and to a fixed anchor point, each of said levers being mounted to rock to and from a dead centre position with respect to the line of action of its associated spring, and a rotatably-mounted mass attached to each of said levers so as to move said lever from its dead centre position due to centrifugal force, at a predetermined speed of rotation to enable each of said extension springs to exert a transverse component of its force upon said movably-mounted plate to oppose the force exerted by said compression springs and to effect frictional engagement of said driving and driven elements.

7. A friction clutch, comprising in combination, a driven element, a driving element slidably mounted to move into engagement with said driven element, a movably-mounted plate for transmitting engaging force to said slidably-mounted driving element, a plurality of springs interposed directly between said movably-mounted plate and said slidably-mounted driving element and unstressed in the disengaged position of the clutch, a second elastic force unit comprising a converter mechanism organized to convert the falling force characteristic of a plurality of relaxing springs into a rising force effort exerted directly upon said movably-mounted plate during the clutch-engaging movement and when the clutch is engaged, and means for rendering said converter mechanism operative on said movably mounted plate to take part in storing energy in said plurality of springs and so to maintain said driven and driving elements in engagement.

8. A friction clutch comprising in combination, frictionally-engaging parts, a movably-mounted member for transmitting engaging force to said parts, a first elastic force unit comprising a spring interposed directly between said member and one of said frictionally-engaging parts, and unstressed in the disengaged position of the clutch, a second elastic force unit comprising a spring and a lever mounted so as to rock to and from a dead centre position with respect to the line of action of said second-mentioned spring, said second-mentioned spring exerting through said lever a force on said movably-mounted member in a direction perpendicular to the line of action of said second-mentioned spring, and being entirely relaxed when its effective lever arm is perpendicular to its line of action, and a rotatably-mounted mass connected to said lever so as to rock said lever from its dead centre position at a predetermined speed of rotation in order to exert a thrust on said movably-mounted member and to enable said second-mentioned spring to act in conjunction with said thrust to bring said frictional-engaging parts into engagement.

9. A friction clutch comprising in combination a member mounted to rotate about an axis, a second member mounted to rotate about said axis and to move along said axis to engage said first-mentioned member frictionally with pressure increasing from zero, a third member mounted to rotate with said second member and to move relatively thereto along said axis, a first elastic force unit interposed between said second and third members, and a second elastic force unit mounted to rotate with said third member and comprising a spring and a lever mounted to rock substantially to and from a dead center position with respect to the line of action of said spring, the latter being arranged so that, when said lever is rocked away from said dead center position, said spring relaxes while exerting an increasing transverse component of force on said third member to increase the pressure between said first-mentioned and second members by stressing said first elastic force unit, and that, when said lever is substantially in said dead center position, said first elastic force unit is relaxed.

GEORGE CARWARDINE.